United States Patent [19]

Mizuhara

[11] Patent Number: 4,684,579
[45] Date of Patent: Aug. 4, 1987

[54] DUCTILE LOW TEMPERATURE BRAZING ALLOY FOIL

[75] Inventor: Howard Mizuhara, Hillsborough, Calif.

[73] Assignee: GTE Products Corporation, Stamford, Conn.

[21] Appl. No.: 877,628

[22] Filed: Jun. 23, 1986

Related U.S. Application Data

[63] Continuation-in-part of Ser. No. 823,200, Jan. 28, 1986, which is a continuation of Ser. No. 757,962, Sep. 20, 1984, Pat. No. 4,623,513, which is a continuation of Ser. No. 394,226, Jul. 1, 1982, abandoned.

[51] Int. Cl.$^4$ .............................................. C22C 5/08
[52] U.S. Cl. .................................. 428/606; 420/502; 148/430; 228/263.11
[58] Field of Search ................ 428/606; 420/489, 492, 420/495, 497, 502, 501, 529, 539, 552, 580, 587; 148/430, 432, 436, 437, 438, 442; 228/56 R, 263.11, 263.12; 219/146.22, 85 H, 129

[56] References Cited

U.S. PATENT DOCUMENTS

| | | | |
|---|---|---|---|
| 2,944,892 | 7/1960 | Stand | 420/502 |
| 3,126,273 | 3/1964 | Justi et al. | 420/501 |
| 3,387,970 | 6/1968 | Wainer | 428/606 |
| 3,455,663 | 7/1969 | Zdanuk | 420/502 |

FOREIGN PATENT DOCUMENTS 45-39337 12/1970 Japan .................................. 420/502

OTHER PUBLICATIONS

*High Purity Precision Alloys*, "Semalloy Brazing Alloys".

*Primary Examiner*—L. Dewayne Rutledge
*Assistant Examiner*—Deborah Yee
*Attorney, Agent, or Firm*—Donald R. Castle

[57] ABSTRACT

Reactive metal silver alloys containing controlled levels of copper, aluminum or mixtures thereof liquidus temperatures in the range of from about 750° C. to about 950° C., are ductile and after brazing are relatively free of hard dispersed phases. The level of reactive metal is kept below 4% by weight and from about 0.25% to about 2.0% is preferred.

3 Claims, 1 Drawing Figure

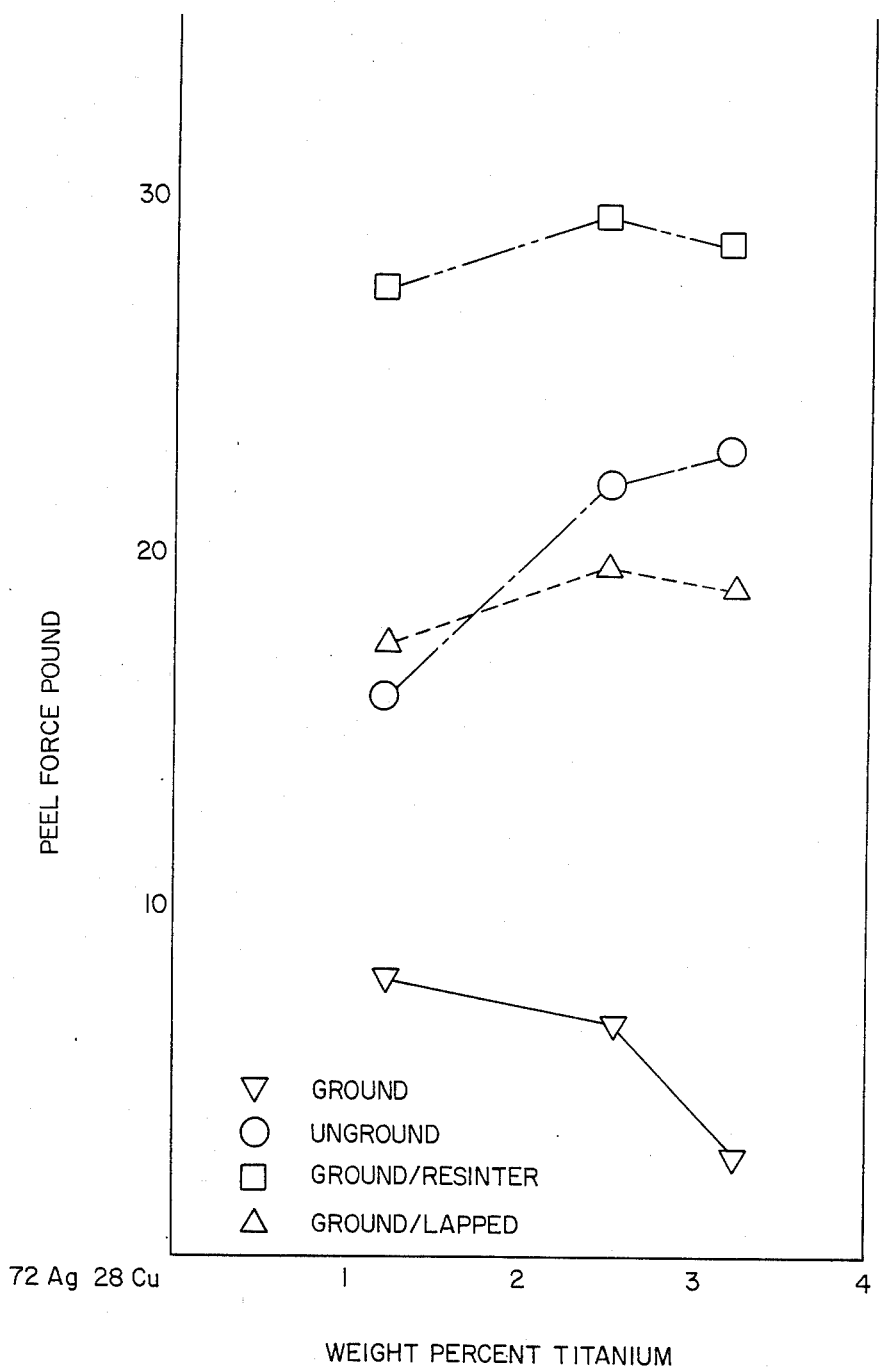

DUCTILE LOW TEMPERATURE BRAZING ALLOY FOIL

CROSS REFERENCE TO RELATED APPLICATIONS

This application is a continuation-in-part of Ser. No. 823,200 filed Jan. 28, 1986 which was a continuation of Ser. No. 757,962 filed Sept. 20, 1984 now U.S. Pat. No. 4,623,513 which was a continuation of Ser. No. 394,226 filed on July 1, 1982, now abandoned.

FIELD OF INVENTION

This invention relates to brazing alloys. More particularly it relates to low temperature brazing alloys containing titanium.

BACKGROUND

An alloy foil sold under the trademark of Ticusil by the Wesgo Division of GTE Products Corporation, Belmont, Calif. contains 4.5% by weight of titanium, 68.8% by weight of silver and 26.7% by weight of copper. This composite alloy, while having the ability to wet various ceramic materials and has a relatively low brazing temperature, is not ductile and can not be rolled to a foil in a satisfactory manner and upon brazing contains a brittle dispersed phase.

Other titanium containing alloys containing higher amounts titanium are known to wet ceramics. These can be made into a ductile foil form by rapid solidification techniques, however, upon brazing will form a joint containing a brittle dispersed phase.

SUMMARY OF THE INVENTION

Reactive metal-silver alloys containing specified amounts of silver and a reactive metal and controlled amounts of copper or aluminum or mixtures thereof also have liquidus temperatures in the range of from about 750° C. to about 950° C. are ductile and after brazing are relatively free of hard dispersed phases.

BRIEF DESCRIPTION OF THE DRAWING

The FIGURE shows the effect upon the peel strength on 97.6% alumina of increasing the titanium content in the 72% Ag 28% Cu eutectic.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

Within the context of this application the term "reactive metal" means titanium, vanadium, zirconium and mixtures thereof.

The amount of the reactive metal in a reactive-silver alloy containing copper or aluminum or mixtures thereof can not appreciably exceed 4% by weight and achieve a ductile material which upon brazing is free of dispersed phases. Table I below shows the effect upon hardness and ductility of various Ti-Ag-Cu alloys.

TABLE I

| % Titanium (by weight) | % Ag (by weight) | % Cu (by weight) | Knopp Hardness 50 g | Ductility |
|---|---|---|---|---|
| 0 | 72 | 28 | 140 | ductile |
| .5 | 71.6 | 27.9 | 140 | ductile |
| 1.0 | 71.3 | 27.7 | 145 | ductile |
| 3.0 | 69.8 | 27.2 | 140 | ductile |
| 4.0 | 69.1 | 26.9 | 130 | ductile |
| 4.5 | 68.8 | 26.7 | 201 | ductile |
|  |  |  | 201(M) | cracks |
|  |  |  | 664(D) | 2 phases |
| 5.0 | 68.4 | 26.6 | 190(M) | cracks |
|  |  |  | 530(D) | 2 phases |

M = Matrix
D = Dispersed Phase

As can be seen from the data in Table I about 4% by weight of titanium is the upper weight limit on the amount of titanium that can be present in the Ti-Ag-Cu alloy system and achieve ductility. Similar results upon ductility are achieved when the Ag-Cu ratio changes from the 72% Ag-28% Cu eutectic. Additionally similar ductility results are achieved in the Ti-Ag-Al system.

When vanadium or zirconium or mixtures thereof is the reactive metal the material is not as ductile as when titanium is the reactive metal. The presence of brittle dispersed phases relates to the level of the reactive metal and is independent of the particular reactive metal used. When the reactive metal content is above about 2% by weight when vanadium, zirconium or mixtures thereof are used, rapid solidification manufacture techniques or intermediate annealing is required to produce a ductile foil. Titanium is the preferred reactive metal.

In many brazing applications it is desired to utilize relatively low brazing temperatures, that is the liquidus of the alloy should be in the 600° C. to 950° C. range thus the lower brazing temperatures can be utilized.

While the liquidus temperature is in the ranges specified, the flow temperature, that is the temperature at which the alloys of this invention flow and wet the materials to be brazed is important in utilizing the materials using conventional brazing techniques. If the materials to be brazed can withstand about 900° C., it is preferred to utilize brazing temperatures in excess of 900° C. even if the particular brazing alloy has a lower liquidus temperature. The flow temperatures for the products of this invention generally range from about 825° C. to about 1000° C.

The amount of reactive metal in the alloys is from about 0.25% by weight to about 4% by weight with from about 0.25% by weight to about 2.0% by weight being especially preferred. The amount of silver is from about 20% by weight to about 98.75% by weight. It is preferred that the silver content be between about 60% by weight and about 75% by weight.

When copper and aluminum are present in the alloy, the weight percent of these elements can vary from about 1% by weight to about 70% by weight. In the Ti-Ag-Cu system it is preferred that the eutectic having a weight ratio of Ag:Cu of about 72:28 be employed. The preferred copper weight range therefore varies from about 20% by weight to about 40% by weight.

In most instances the ceramics are ground or ground and lapped prior to brazing. It has been found that for ground and resintered 97.6% alumina ceramic that the peel strength peaks with a composition having about 2.5% by weight of titanium, about 70.2% by weight of silver and about 27.3% by weight of copper. With ground 97.6% alumina the peel strength drops dramatically with titanium contents higher than about 2.5% by weight. The FIGURE clearly shows the effect of higher titanium contents upon the peel strength of the braze. As it clearly seen about 2.5% titanium is critical when brazing 97.6% alumina which has had conventional surface treatment, that is by grinding or grinding plus sintering or grinding plus lapping. While unground 97.6% alumina does not indicate the criticality of 2.5% titanium, a supplier of the alloy can not be certain of the surface finish of the customer, therefore the brazing foils of this invention containing from about 1 to about 2.5% titanium, the balance having Ag Cu in a weight ratio of about 65:33 have superior overall performance.

To more fully illustrate the subject invention the following detailed examples are presented. All parts, percentages and proportions are by weight unless otherwise indicated.

EXAMPLE 1

Four alloys containing about 1%, 2%, 3% and 4% titanium are prepared using skull melting equipment and a base alloy of the 72% silver, 28% copper eutectic. These four alloys are rolled down to a workable, ductile, 5 mil thick foil.

A portion of each of the foils is placed between two pieces of 97% alumina ceramic which are ¾" wide by 1½" long by 0.025" thick. These four samples are brazed at about 850° C. at 10⁻⁵ mm Hg for about 5 minutes. Suitable brazed joints are achieved with all four alloys.

EXAMPLE 2

Silicon nitride sold under the tradename of SNW-1000 by the Wesgo Division of GTE Products Corporation, Belmont, Calif. is satisfactorily brazed to mild steel at a brazing temperature of about 850° C. at 10⁻⁵ mm Hg pressure using a brazing foil of about 3 mils thickness and having composition of about 2% titanium, about 27.4% copper and about 70.6% silver.

EXAMPLE 3

The following alloys are prepared as in Example 1.

| 72% Ag–28% Cu | 99.0% | 98.0% | 97.0% | 96.0% |
|---|---|---|---|---|
| Ti | 0.5% | 1.0% | 1.5% | 2.0% |
| Zr | 0.5% | 1.0% | 1.5% | 2.0% |

The rolled foil is placed between two alumina substrates and brazed. The use of Ti Zr 1:1 ratio shows reduced flow temperature compared to Ti alloy and flows at 835° C.

EXAMPLE 4

An alloy of 70% Ag, 28% Cu, 1.5% Ti, 0.5% V is cast and the ingot section is polished. The observed surface shows no large hard dipsersed phases.

EXAMPLE 5

A simple ternary system of AgCuTi which simplifies both manufacturing and analyses were selected over quarternary system. The following alloys are melted and cast into ¼" thick copper mold. A section of each ingot is cut, polished and observed for dispersed phases.

| SILVER-COPPER TITANIUM FILLER METAL | | | | | | | |
|---|---|---|---|---|---|---|---|
| | A | B | C | D | E | F | G |
| Ag | 70% | 69% | 68% | 67% | 66% | 65% | 64% |
| Cu | 28% | 29% | 30% | 31% | 32% | 33% | 34% |
| Ti | 2% | 2% | 2% | 2% | 2% | 2% | 2% |
| | | | In Weight Percent | | | | |

Photomicrograph of as cast and polished specimen are made on all the castings and hardness measurements are also carried out. Differential thermal analyses are carried out on each alloy to determine the solidus and the liquidus temperatures. All ingots are easily rolled down to 2 mil thickness with composition E F & G giving the best finished foils.

| Test Result Composition | A | B | C | D | E | F | G |
|---|---|---|---|---|---|---|---|
| Dispersed Phase | Yes | Yes | Yes | Yes | V. Slight | V. Slight | No |
| Acicular Phase | No | No | No | No | Yes | Yes | Yes |
| Knoop Hardness | 145 | 142 | | 140 | 121 | 125 | 112 |
| Liquidus °C. | | 800 | | 802 | 804 | | 812 |
| Solidus °C. | | 783 | | 780 | 775 | | 782 |

Additionally, it has been found that compositions containing from about 64% to about 66% silver, about 2% titanium and balance copper form braze joints virtually free of dispersed phases, however, it is found that when the percent silver increases and copper decreases so that the silver content ranges from about 67% to about 70% silver, about 2% titanium there is a presence of dispersed phases. It has further been found however that these dispersed phases can be eliminated while maintaining the remaining beneficial properties by substituting vanadium for up to ½ of the titanium.

In the foregoing Ti-Ag-Cu system those alloys containing from about 1.75% about 2.5% titanium are especially preferred.

Other preferred compositions are those containing from about 1% to about 1.75% by weight titanium, from about 0.5% to about 0.9% by weight of vanadium, from about 64% to about 72% by weight of silver, balance copper.

While there has been shown and described what are at present considered the preferred embodiments of the invention, it will be obvious to those skilled in the art that various changes and modifications may be made therein with out departing from the scope of the invention as defined by the appended claims.

What is claimed is:

1. An article consisting essentially of a ductile foil of a brazing alloy consisting essentially of from about 1.75% to about 2.5% by weight of titanium, from about 64% to about 66% by weight of silver, balance copper wherein said alloy has a liquidus temperature of from about 600° C. to about 950° C.

2. An article according to claim 1 wherein said silver and copper are in a weight ratio of about 65:33.

3. An article consisting essentially of a ductile foil of a brazing alloy consisting essentially of from about 1% to about 1.75% by weight of titanium, from about 0.5% to about 0.9% by weight of vanadium, from about 64% to about 72% by weight of silver, balance copper.

* * * * *